United States Patent
Yang et al.

(10) Patent No.: US 11,841,839 B1
(45) Date of Patent: Dec. 12, 2023

(54) PREPROCESSING AND IMPUTING METHOD FOR STRUCTURAL DATA

(71) Applicant: ZHEJIANG LAB, Hangzhou (CN)

(72) Inventors: Jiaxi Yang, Hangzhou (CN); Chongning Na, Hangzhou (CN); Ye Yang, Hangzhou (CN); Kai Ding, Hangzhou (CN); Yao Yang, Hangzhou (CN); Yihan Wang, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/143,059

(22) Filed: May 3, 2023

(30) Foreign Application Priority Data

Sep. 2, 2022 (CO) .......................... 202211068167.2

(51) Int. Cl.
*G06F 16/215* (2019.01)
*G06N 3/0475* (2023.01)
*G06N 3/0455* (2023.01)

(52) U.S. Cl.
CPC ......... *G06F 16/215* (2019.01); *G06N 3/0455* (2023.01); *G06N 3/0475* (2023.01)

(58) Field of Classification Search
CPC ... G06F 16/215; G06N 3/0475; G06N 3/0455
See application file for complete search history.

(56) References Cited

U.S. PATENT DOCUMENTS

2023/0177409 A1* 6/2023 Haslbeck ............... G06N 20/20
707/691

FOREIGN PATENT DOCUMENTS

CN 109165664 1/2019

\* cited by examiner

*Primary Examiner* — Etienne P Leroux
(74) *Attorney, Agent, or Firm* — Jiwen Chen; Joywin IP Law PLLC

(57) ABSTRACT

The present invention discloses a preprocessing and imputing method for structural data, comprising: step 1, querying the missing information of an original data, counting missing values, and obtaining a missing rate for the original data; step 2, based on the missing rate, performing listwise deletion on the original data, and then traversing the rows to generate corresponding dichotomous arrays, converting the arrays to the form of histogram, calculating the maximum rectangular area formed by the corresponding histogram, and then sorting all rectangular areas to obtain the maximum complete information matrix; step 3, using multiple imputation by chained equations, auto-encoders, or generative adversarial imputation networks to impute missing values on the original data. The present invention can carry out missing information statistics on the original data, automatically search the maximum complete information that meets the conditions, impute the structural data, greatly improve the quality of the original dataset and convenience for subsequent prediction tasks.

5 Claims, 3 Drawing Sheets

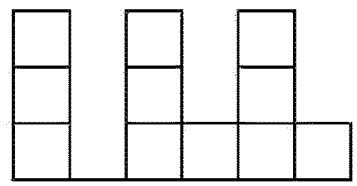
Figure 3
Figure 4
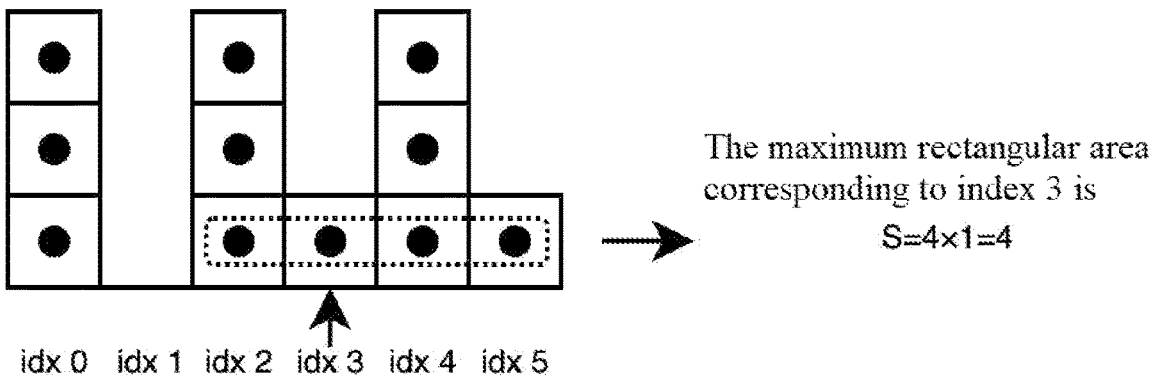
Figure 5

PREPROCESSING AND IMPUTING METHOD FOR STRUCTURAL DATA

This application claims priority of Chinese Application No. 202211068167.2, filed Sep. 2, 2022, which is hereby incorporated by reference.

FIELD OF TECHNOLOGY

The present invention relates to the field of structural data preprocessing, in particular to a preprocessing and imputing method for structural data.

BACKGROUND TECHNOLOGY

Missing data is a common issue for machine learning tasks in real scenarios. Missing data will lead to many problems, such as overfitting, data leakage, and thus the model's performance in the training set is very different from that in the real test scenario. The traditional imputing method cannot generally meet the needs of multiple business scenarios, especially when facing high dimensions and large quantities of data, the traditional imputing method often fails to get imputed data that are close to the distribution of the original data. Therefore, an automated, systematic structural data preprocessing and imputing system suitable for data sets in multiple scenarios needs to be established.

SUMMARY OF THE INVENTION

In order to solve the above technical problems in the prior art, the present invention proposes a preprocessing and imputing method for structural data, and its specific technical scheme is as follows:

A preprocessing and imputing method for structural data, comprising the following steps:

Step 1, querying the missing information of an original data, counting missing values, and obtaining a missing rate for the original data;

Step 2, based on the missing rate, performing listwise deletion on the original data, and then traversing the rows to generate corresponding dichotomous arrays, converting the arrays to the form of histogram, calculating the maximum rectangular area formed by the corresponding histogram, and then sorting all rectangular areas to obtain the maximum complete information matrix; and Step 3, using multiple imputation by chained equations, auto-encoders, or generative adversarial imputation networks to impute missing values on the original data.

Preferably, the step 1 is as follows:

traversing feature variables of each column in the original data, sequentially counting the missing value of each column, i.e. the number of missing data, and calculating the corresponding missing rate;

at the same time, traversing each row of data, sequentially counting the number of missing data in each row, and calculating the corresponding missing rate;

finally, the missing rate is sorted from high to low, and the column name and its corresponding missing rate are returned.

Preferably, the missing rate is the number of missing data units in the column or row divided by the total number of missing data units in the column or row.

Preferably, performing listwise deletion on the original data of step 2 is as follows: deleting rows and columns with the missing rate greater than 70% from the original data based on the missing information, except for the specified missing rate or specified column.

Preferably, traversing the rows to generate corresponding dichotomous arrays specifically includes:

step a: assigning a 0-1 value to the data after removing rows and columns with the missing rate greater than 70% from the original data, assigning a value of 0 to the missing units in the data, and assigning a value of 1 to the remaining units to generate a 0-1 binary matrix;

step b: for each row of the binary matrix, when in the i-th row, initializing an array with a length of the number of columns of the binary matrix, the j-th element in the array, and the value of the j-th element is the number of value assigned to the i-th row and j-th column of the binary matrix, and the upward value is continuously 1; if the value assigned to the i-th row and j-th column of the matrix is 0, indicating that the corresponding position in the data is empty, then the element is 0; generating a height array of the i-th row based on the above judgment method;

step c: generating a height array corresponding to each row using the same method as step b.

Preferably, converting the arrays to the form of histogram and calculating the maximum rectangular area formed by the corresponding histogram specifically include:

step d: converting the height array corresponding to each row into the form of histogram, and treating each element in the array as a rectangle with a height of element value and a width of 1, this array can be regarded as a data structure of the form of histogram;

step e: for each rectangle in step d above, constructing a rectangle from it as the starting point, searching for rectangles that are continuous in both left and right positions with height greater than or equal to oneself, until the conditions are not met and exit the search, at this point, the distance between the leftmost rectangle and the rightmost rectangle that meet the requirements is the length of the rectangle that can be constructed, and the height of the rectangle is the height of the constructed rectangle, multiplying length and height, that is the maximum rectangular area that can be formed by the current histogram;

step f: using the same method as step e to traversing each row in sequence and calculating the maximum rectangular area that can be constructed.

Preferably, sorting all rectangular areas to obtain the maximum complete information matrix specifically includes:

step g: sorting the calculated maximum rectangular area that can be constructed for each row, and obtaining four vertex coordinates of the sorted maximum rectangle;

step h: extracting the corresponding rectangular data from the original data based on the coordinates to achieve the maximum completed information rectangular collection; among them, if the extracted data does not fully include the column data corresponding to the specified column, the corresponding data is extracted from the data of the specified column according to the range of vertical coordinates, horizontally concatenated with the rectangular data mentioned above, and duplicate columns are removed, which is the largest complete information rectangle; if the extracted data already fully contains the column data corresponding to the specified column, the maximum complete information rectangle is directly returned.

Preferably, the multiple imputation by chained equations specifically includes the following steps:

step 101, basic imputing the missing values of the original data, the imputed value is the average or mode of the column, while marking the position of the imputed value;

step 102, traversing each column in the data, using each column as the prediction target object and the other remaining columns as input features, using a regression model to perform regression calculations on the prediction target and input features, output a new column of prediction results, replacing the values marked in the original column with the corresponding values in the prediction results, and continuing to use the replaced columns as input features for other regression calculations; traversing until all missing values in the column have been replaced by the predicted values of the regression; and step 103, repeating steps 101 to 102 to generate several imputed datasets as candidate output results for imputing the original data.

Preferably, the multiple imputation by auto-encoders, a neural network model adopted includes encoder and decoder, which specifically includes the following steps:

step 201, inputting the original data into the model, passing through the encoder composed of several linear layers and the nesting of activation function, and outputting feature representation mapped to high dimension;

step 202, passing through the decoder composed of several linear layers and the nesting of activation function, the output of the encoder is symmetrically scaled back to the original dimension, driving the learning of robust features in the original data; and step 203, training the model and outputting the imputed dataset; the error function used for the model training is the mean square error function, and the mean square error function is as follows:

$$MSE = \frac{1}{n}\sum_{i=1}^{n}(Y_i - \hat{Y}_i)^2$$

where $Y_i$ the original data value, and $\hat{Y}_i$ is the generated imputed value.

Preferably, the generative adversarial imputation networks, the adversarial generation network model adopted consists of two modules: a generator and a discriminator, which specifically include the following steps:

step 301, inputting the original data into the adversarial generation network model, observing the original raw data by the generator, and using the real data to predict missing data, outputting complete data;

step 302, providing additional prompt information for the discriminator, determining the observed true values and imputed generated values in the complete data through the discriminator; and step 303, the generator outputs the imputed dataset based on the true distribution of the original data.

Beneficial effects:

The present invention can carry out missing information statistics on the original data, automatically search for the maximum complete information that meets the conditions, and impute structural data through chained equation calculation, machine learning, deep learning and other methods, so as to greatly improve the quality of the original data set, effectively control the data leakage and sample imbalance caused by missing data in the prediction task, which further leads to the problems including overfitting of the model and model robustness decline. The present invention provides great convenience for subsequent prediction tasks and improves the quality of data.

BRIEF DESCRIPTION OF THE FIGURES

FIG. 3 is a schematic diagram of the process of traversing a binary matrix to generate corresponding dichotomous arrays in an embodiment of the present invention;

FIG. 4 is a schematic diagram of the conversion process from a height array to a histogram in the embodiment of the present invention;

FIG. 5 is a schematic diagram of the process for calculating the maximum rectangular area formed by a histogram in an embodiment of the present invention;

DETAILED DESCRIPTION OF THE EMBODIMENTS

In order to make the purpose, technical solution, and technical effects of the present invention clearer and clearer, the following is a further detailed explanation of the present invention in conjunction with the accompanying figures and embodiments of the specification.

Missing data refers to the loss of values for a certain attribute or attributes in a dataset due to certain reasons, which is a common problem encountered during data preprocessing. There are three main types of data loss mechanisms: Missing Completely at Random , Missing at Random, and Missing Not At Random. Missing Completely at Random refers to the missing of data that is completely random and independent of the values of the variable itself or other variables, which is extremely rare in practice. Missing at Random loss refers to the loss of missing values that are not related to this variable, but rather to other (partial) variables in the dataset. Missing Not At Random refers to the missing of data not only related to the values of other variables, but also to its own values.

Figures 1, 2:
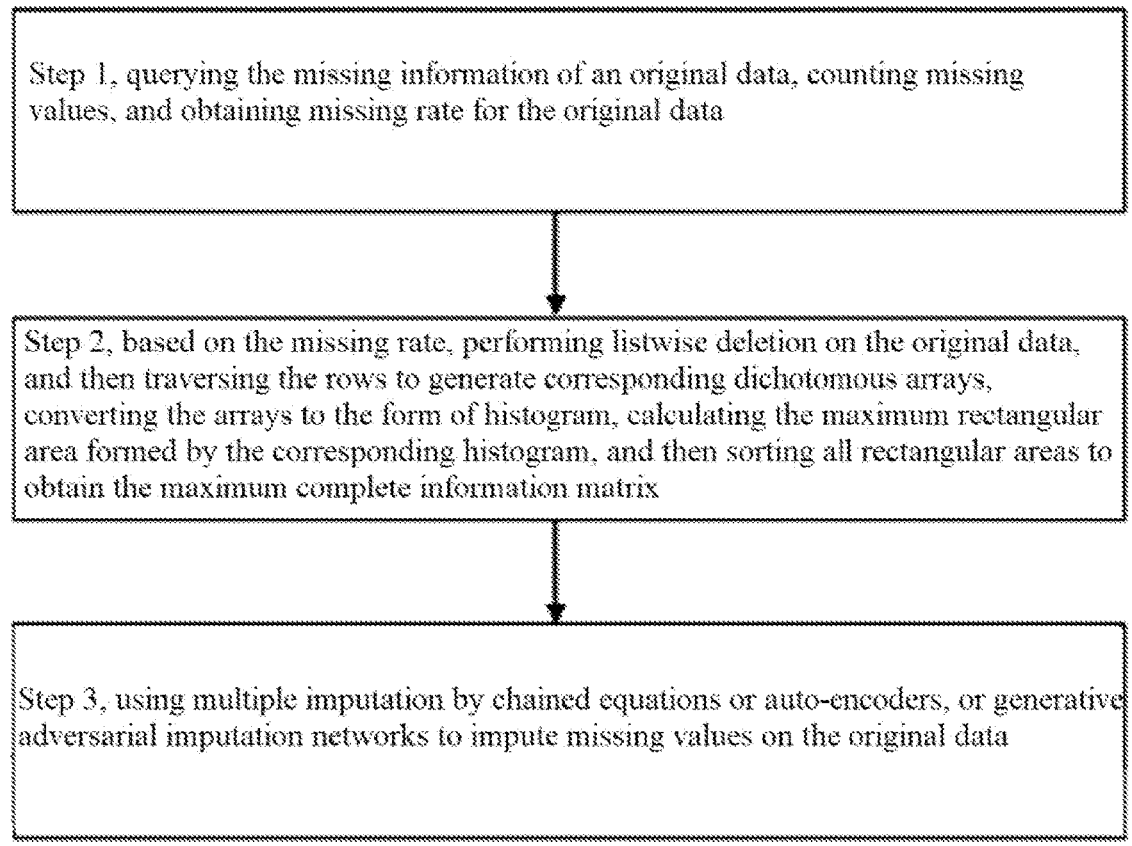
FIG. 1 is a flowchart of a preprocessing and imputing method for structural data of the present invention.
FIG. 2 is a schematic diagram of the process of generating a 0-1 binary matrix by assigning 0-1 values to the original data containing missing values in the embodiment of the present invention.

The present invention provides a preprocessing and imputing method and system for structural data, as shown in FIG. 1, the system includes a data missing query module, a maximum complete information matrix collection module, and a data missing value imputing module. The method includes the following steps:

Step 1, the data missing query module is used to query the missing information of an original data, count missing values, and obtain a missing rate for the original data.

Specifically, for the input original data, the data missing query module traverses feature variables of each column in the original data, sequentially counts the missing value of each column, i.e. the number of missing data, and calculates the corresponding missing rate. The missing rate is the number of missing data units in the column or row divided by the total number of missing data units in the column or row.

At the same time, traversing each row of data, sequentially counting the number of missing data in each row, and calculating the corresponding missing rate. Finally, the missing rate is sorted from high to low, and the column name and its corresponding missing rate are returned.

The query of missing information in the data set has a very important impact on the decision analysis of subsequent tasks. The missing information found above is an important basis for subsequent data processing. The characteristics with too large missing rate will affect the data quality, so it needs to be deleted.

Step 2, based on the missing rate, the maximum complete information matrix collection module performs listwise deletion on the original data, and then traverses the rows to generate corresponding dichotomous arrays, converts the arrays to the form of histogram, calculates the maximum rectangular area formed by the corresponding histogram, and then sorts all rectangular areas to obtain the maximum complete information matrix.

The purpose of collecting the largest complete information matrix from the original data containing missing values is to extract as much complete original data information as possible, in order to facilitate deep analysis of relevant features of the original data based on this information matrix.

Performing listwise deletion on the original data of step 2 is as follows: deleting rows and columns with the missing rate greater than 70% from the original data based on the missing information, except for the specified missing rate or specified column.

Traversing the rows to generate corresponding dichotomous arrays specifically includes:

step a: assigning a 0-1 value to the data after removing rows and columns with the missing rate greater than 70% from the original data, assigning a value of 0 to the missing units in the data, and assigning a value of 1 to the remaining units to generate a 0-1 binary matrix, as shown in FIG. 2;

step b: for each row of the binary matrix, when in the i-th row, initializing an array with a length of the number of columns of the binary matrix, the j-th element in the array, and the value of the j-th element is the number of value assigned to the i-th row and j-th column of the binary matrix, and the upward value is continuously 1; if the value assigned to the i-th row and j-th column of the matrix is 0, indicating that the corresponding position in the data is empty, then the element is 0; generating a height array of the i-th row based on the above judgment method, as shown in FIG. 3;

step c: generating a height array corresponding to each row using the same method as step b.

Converting the arrays to the form of histogram and calculating the maximum rectangular area formed by the corresponding histogram specifically include:

step d: converting the height array corresponding to each row into the form of histogram, and treating each element in the array as a rectangle with a height of element value and a width of 1, this array can be regarded as a data structure of the form of histogram; as shown in FIG. 4, the third row of data in this embodiment is used as an example.

Step e: for each rectangle in step d above, constructing a rectangle from it as the starting point, searching for rectangles that are continuous in both left and right positions with height greater than or equal to oneself, until the conditions are not met and exit the search, at this point, the distance between the leftmost rectangle and the rightmost rectangle that meet the requirements is the length of the rectangle that can be constructed, and the height of the rectangle is the height of the constructed rectangle, multiplying length and height, that is the maximum rectangular area that can be formed by the current histogram.

Step f: using the same method as step e to traversing each row in sequence and calculating the maximum rectangular area that can be constructed.

Sorting all rectangular areas to obtain the maximum complete information matrix specifically includes:

Step g: sorting the calculated maximum rectangular area that can be constructed for each row, and obtaining four vertex coordinates of the sorted maximum rectangle;

Step h: extracting the corresponding rectangular data from the original data based on the coordinates to achieve the maximum completed information rectangular collection; among them, if the extracted data does not fully include the column data corresponding to the specified column, the corresponding data is extracted from the data of the specified column according to the range of vertical coordinates, horizontally concatenated with the rectangular data mentioned above, and duplicate columns are removed, which is the largest complete information rectangle; if the extracted data already fully contains the column data corresponding to the specified column, the maximum complete information rectangle is directly returned.

Step 3, using multiple imputation by chained equations, auto-encoders, or generative adversarial imputation networks to impute missing values on the original data.

The multiple imputation by chained equations specifically includes the following steps:

step 101, basic imputing the missing values of the original data, the imputed value is the average or mode of the column, while marking the position of the imputed value;

step 102, traversing each column in the data, using each column as the prediction target object and the other remaining columns as input features, using a regression model (logistic regression, tree model, etc.) to perform regression calculations on the prediction target and input features, output a new column of prediction results, replacing the values marked in the original column with the corresponding values in the prediction results, and continuing to use the replaced columns as input features for other regression calculations; traversing until all missing values in the column have been replaced by the predicted values of the regression;

step 103, repeating steps 101 to 102 to generate several imputed datasets as candidate output results for multiple imputation by chained equations (MICE) method imputing the original data.

The multiple imputation by auto-encoders (MIDA), it is a imputing method based on the Encoder-Decoder architecture of a neural network, that is the neural network model adopted includes encoder and decoder, which specifically includes the following steps:

step 201, inputting the original data into the model, passing through the encoder composed of several linear layers and the nesting of activation function, and outputting feature representation mapped to high dimension;

step 202, passing through the decoder composed of several linear layers and the nesting of activation function, the output of the encoder is symmetrically scaled back to the original dimension, driving the learning of robust features in the original data;

step 203, training the model and outputting the imputed dataset;

The error function used for the model training is the mean square error function, and the mean square error function is as follows:

$$MSE = \frac{1}{n}\sum_{i=1}^{n}(Y_i - \hat{Y}_i)^2$$

where $Y_i$ the original data value, and $\hat{Y}_i$ is the generated imputed value.

The generative adversarial imputation networks, the adversarial generation network model adopted consists of two modules: a generator and a discriminator, which specifically include the following steps:

step 301, inputting the original data into the adversarial generation network model, observing the original raw data by the generator, and using the real data to predict missing data, outputting complete data;

step 302, providing additional prompt information for the discriminator, determining the observed true values and imputed generated values in the complete data through the discriminator;

step 303, the generator outputs the imputed dataset based on the true distribution of the original data.

Corresponding to the aforementioned embodiment of the preprocessing and imputing method for structural data, the present invention also provides an embodiment of the preprocessing and imputing system for structural data.

Figure 6:
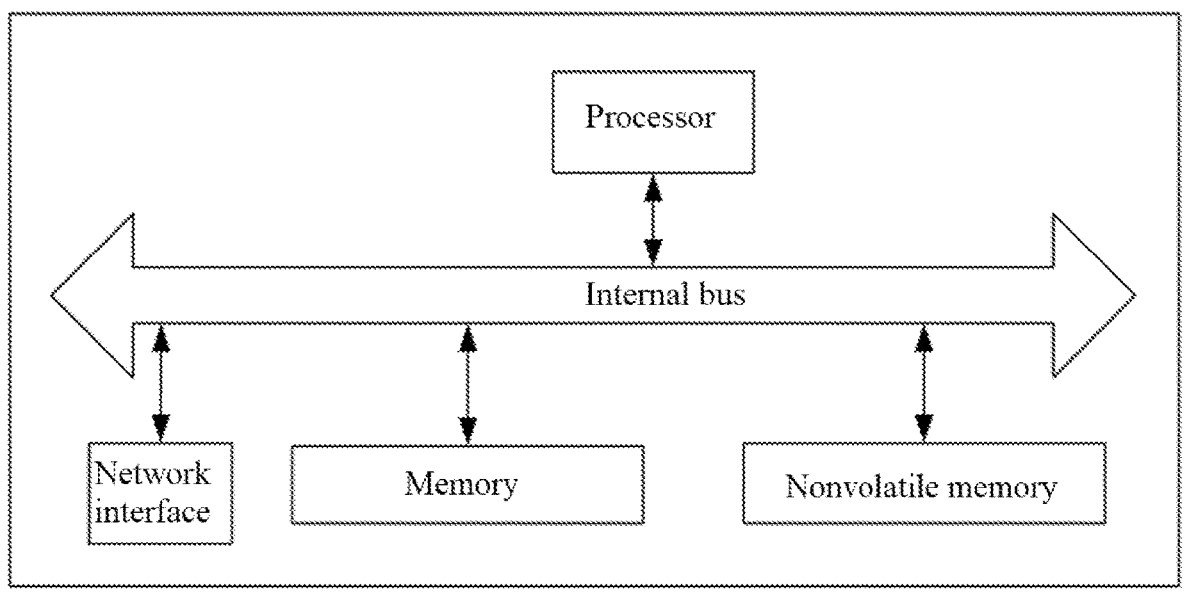
FIG. 6 is the structural diagram of a preprocessing and imputing system for structural data in the embodiment of the invention.

As shown in FIG. 6, the preprocessing and imputing system for structural data provided by the embodiment of the present invention includes one or more processors to implement the preprocessing and imputing method for structural data in the above embodiment.

The embodiment of the preprocessing and imputing system for structural data of the present invention can be applied to any device with data processing capability, which can be a device or device such as a computer. Device embodiments can be implemented through software, or through hardware or a combination of software and hardware. Taking software implementation as an example, as a logical device, it is formed by reading the corresponding computer program instructions from non-volatile memory into memory and running them through the processor of any device with data processing capabilities. In terms of hardware, as shown in FIG. 6, it is a hardware structure diagram of any device with data processing capability where the preprocessing and imputing system for structural data of the present invention is located. In addition to the processor, memory, network interface and non-volatile memory shown in FIG. 6, In the implementation example, any device with data processing capability located in the device can usually include other hardware based on the actual function of the device with data processing capability, and this will not be repeated.

The implementation process of the functions of each unit in the above device is detailed in the implementation process of the corresponding steps in the above method, and will not be described again here.

For device embodiments, since they basically correspond to the method embodiments, it is sufficient to refer to the partial description of method embodiments for relevant aspects. The device embodiments described above are only illustrative, in which the units described as separate components can be or may not be physically separated, and the components displayed as units can be or may not be physical units, that is, they can be located in one place, or they can be distributed across multiple network units. Some or all of the modules can be selected according to actual needs to achieve the purpose of the solution of the present invention. Those skilled in the art can understand and implement it without paying creative labor.

The embodiment of the present invention also provides a computer-readable storage medium on which a program is stored, when the program is executed by the processor, the preprocessing and imputing method for structural data is implemented.

The computer-readable storage medium may be an internal storage unit, such as a hard disk or memory, of any device having data processing capabilities described in any of the preceding embodiments. The computer-readable storage medium can also be any external storage device, such as a plug-in hard disk, Smart Media Card (SMC), SD card, Flash Card, and the like provided on the device. Further, the computer-readable storage medium may include both an internal storage unit of any device with data processing capabilities and an external storage device. The computer-readable storage medium is used to store the computer program and other programs and data required by any device with data processing capabilities, and can also be used to temporarily store data that has been or will be output.

The above is only a preferred embodiment of the present invention and does not impose any formal limitations on the present invention. Although the implementation process of the present invention has been described in detail in the previous text, for those familiar with the technique, they can still modify the technical solutions recorded in the aforementioned examples or replace some of the technical features equally. Any modifications, equivalent substitutions, etc. made within the spirit and principles of the present invention shall be included within the scope of protection of the present invention.

The invention claimed is:

1. A preprocessing and imputing method for structural data comprising the following steps:

step 1, querying missing information of an original data, counting missing values, and obtaining missing rate for the original data, specifically traversing feature variables of each column in the original data, sequentially counting the missing value of each column, which is the number of missing data, and calculating the corresponding missing rate;

at the same time, traversing each row of data, sequentially counting the number of missing data in each row, and calculating the corresponding missing rate; and finally, the missing rate is sorted from high to low, and the column name and its corresponding missing rate are returned;

step 2, based on the missing rate, performing listwise deletion on the original data, and then traversing the rows to generate corresponding dichotomous arrays, converting the arrays to the form of histogram, calculating the maximum rectangular area formed by the corresponding histogram, and then sorting all rectangular areas to obtain the maximum complete information matrix;

performing listwise deletion on the original data of the step 2 is as follows: deleting rows and columns with the missing rate greater than 70% from the original data based on the missing information, except for the specified missing rate or specified column;

wherein, traversing the rows to generate corresponding dichotomous arrays specifically comprises:

step a: assigning a 0-1 value to the data after removing rows and columns with the missing rate greater than 70% from the original data, assigning a value of 0 to the missing units in the data, and assigning a value of 1 to the remaining units to generate a 0-1 binary matrix;

step b: for each row of the binary matrix, when in the i-th row, initializing an array with a length of the number of columns of the binary matrix, the j-th element in the array, and the value of the j-th element is the number of value assigned to the i-th row and j-th column of the binary matrix, and the upward value is continuously 1; if the value assigned to the i-th row and j-th column of the matrix is 0, indicating that the corresponding position in the data is empty, then the element is 0; generating a height array of the i-th row based on the above judgment method; and step c: generating a height array corresponding to each row using the same method as step b;

wherein, converting the arrays to the form of histogram and calculating the maximum rectangular area formed by the corresponding histogram specifically comprise:

step d: converting the height array corresponding to each row into the form of histogram, and treating each element in the array as a rectangle with a height of element value and a width of 1, this array can be regarded as a data structure of the form of histogram;

step e: for each rectangle in step d above, constructing a rectangle from it as the starting point, searching for rectangles that are continuous in both left and right positions with height greater than or equal to oneself, until the conditions are not met and exit the search, at this point, the distance between the leftmost rectangle and the rightmost rectangle that meet the requirements is the length of the rectangle that can be constructed, and the height of the rectangle is the height of the constructed rectangle, multiplying length and height, that is the maximum rectangular area that can be formed by the current histogram; and step f: using the same method as step e to traversing each row in sequence and calculating the maximum rectangular area that can be constructed;

wherein, sorting all rectangular areas to obtain the maximum complete information matrix specifically comprises:

step g: sorting the calculated maximum rectangular area that can be constructed for each row, and obtaining four vertex coordinates of the sorted maximum rectangle; and step h: extracting the corresponding rectangular data from the original data based on the coordinates to achieve the maximum completed input information rectangular collection;

wherein, if the extracted data does not fully include the column data corresponding to the specified column, the corresponding data is extracted from the data of the specified column according to the range of vertical coordinates, horizontally concatenated with the rectangular data mentioned above, and duplicate columns are removed, which is the largest complete information rectangle; if the extracted data already fully contains the column data corresponding to the specified column, the maximum complete information rectangle is directly returned; and step 3, using multiple imputation by chained equations or auto-encoders, or generative adversarial imputation networks to impute missing values on the original data.

2. The preprocessing and imputation method for structural data according to claim 1 wherein the missing rate is the number of missing data units in the column or row divided by the total number of missing data units in the column or row.

3. The preprocessing and imputing method for structural data according to claim 1, wherein, the multiple imputation by chained equations specifically comprises the following steps:

step 101, basic imputing the missing values of the original data, the imputed value is the average or mode of the column, while marking the position of the imputed value;

step 102, traversing each column in the data, using each column as the prediction target object and the other remaining columns as input features, using a regression model to perform regression calculations on the target variable and input features, output a new column of prediction results, replacing the values marked in the original column with the corresponding values in the prediction results, and continuing to use the replaced columns as input features for other regression calculations; traversing until all missing values in the column have been replaced by the predicted values of the regression;

step 103, repeating steps 101 to 102 to generate several imputed datasets as candidate output results for imputing the original data.

4. The preprocessing and imputing method for structural data according to claim 1, wherein, the multiple imputation by auto-encoders, a neural network model adopted includes encoder and decoder, which specifically comprises the following steps:

step 201, inputting the original data into the model, passing through the encoder composed of several linear layers and the nesting of activation function, and outputting feature representation mapped to high dimension;

step 202, passing through the decoder composed of several linear layers and the nesting of activation function, the output of the encoder is symmetrically scaled back to the original dimension, driving the learning of robust features in the original data; and step 203, training the model and outputting the imputed dataset;

the error function used for the model training is the mean square error function, and the mean square error function is as follows:

$$MSE = \frac{1}{n}\sum_{i=1}^{n}(Y_i - \hat{Y}_i)^2$$

where $Y_i$ the original data value, and $\hat{Y}_i$ is the generated imputed value.

5. The preprocessing and imputing method for structural data according to claim 1, wherein, the generative adversarial imputation networks, the adversarial generation network model adopted consists of two modules: a generator and a discriminator, which specifically comprise the following steps:

step 301, inputting the original data into the adversarial generation network model, observing the original raw data by the generator, and using the real data to predict missing data, outputting complete data;

step 302, providing additional prompt information for the discriminator, determining the observed true values and imputed generated values in the complete data through the discriminator; and step 303, the generator outputs the imputed dataset based on the true distribution of the original data.

* * * * *